(12) United States Patent
Jacobs et al.

(10) Patent No.: US 12,103,049 B2
(45) Date of Patent: Oct. 1, 2024

(54) THREE-DIMENSIONAL VEHICLE MAT WASHER AND RELATED METHOD OF USE

(71) Applicant: Tommy Car Wash Systems, Inc., Holland, MI (US)

(72) Inventors: Austin N. Jacobs, Allendale, MI (US); Andrew S. VanWylen, Holland, MI (US); Davis J. Moes, Grand Rapids, MI (US); Andrew J. Kuper, Holland, MI (US)

(73) Assignee: Tommy Car Wash Systems, Inc., Holland, MI (US)

( * ) Notice: Subject to any disclaimer, the term of this patent is extended or adjusted under 35 U.S.C. 154(b) by 0 days.

(21) Appl. No.: 18/102,406

(22) Filed: Jan. 27, 2023

(65) Prior Publication Data
US 2024/0253084 A1     Aug. 1, 2024

(51) Int. Cl.
*D06G 1/00*     (2006.01)
*B08B 1/12*     (2024.01)
(Continued)

(52) U.S. Cl.
CPC .................. *B08B 1/20* (2024.01); *B08B 1/12* (2024.01); *B08B 3/022* (2013.01); *B60S 3/008* (2013.01); *B60N 3/044* (2013.01)

(58) Field of Classification Search
None
See application file for complete search history.

(56) References Cited

U.S. PATENT DOCUMENTS

| 4,368,627 A | 1/1983 | Bode, Sr. et al. |
| 4,926,520 A * | 5/1990 | Watson .................... D06G 1/00 15/302 |

(Continued)

FOREIGN PATENT DOCUMENTS

| JP | S4969765 U | 6/1974 |
| JP | 07227587 | * 8/1995 |

(Continued)

OTHER PUBLICATIONS

Translation of JP2006068209 by Morishita, published Mar. 16, 2006.*

(Continued)

*Primary Examiner* — Mikhail Kornakov
*Assistant Examiner* — Ryan L Coleman
(74) *Attorney, Agent, or Firm* — Warner Norcross + Judd LLP

(57) ABSTRACT

An apparatus for cleaning a semi-rigid, three-dimensional vehicle mat can include a first set of compliant rollers spaced from one another and a second set of compliant rollers spaced from one another that cooperatively grab and advance the mat toward one or more brushes that scrub debris from above and/or below the mat. One or more of the compliant rollers can deform a distance radially toward an axis of rotation when contacting the mat to accommodate the contours of the mat and still grab the mat for advancing. The apparatus can include a holding pan that supports the mat so it is accessible through a second opening below the brushes and a first opening of a frame that supports the rollers and brushes. A deflector can be included to reroute the mat downstream of the brushes along a pathway toward the pan. A related method of use also is provided.

18 Claims, 15 Drawing Sheets

(51) Int. Cl.
    *B08B 1/20*     (2024.01)
    *B08B 3/02*     (2006.01)
    *B60S 3/00*     (2006.01)
    *B60N 3/04*     (2006.01)

(56)     References Cited

U.S. PATENT DOCUMENTS

| | | | |
|---|---|---|---|
| 7,784,848 B2 | 8/2010 | MacNeil | |
| 2013/0171419 A1* | 7/2013 | Tyler | B60N 3/04 |
| | | | 428/167 |
| 2021/0237131 A1 | 8/2021 | Subar et al. | |

FOREIGN PATENT DOCUMENTS

| | | | |
|---|---|---|---|
| JP | 08323313 | * | 12/1996 |
| JP | 11188192 | * | 7/1999 |
| JP | 2006068209 A | | 3/2006 |
| JP | 3790294 B2 | | 6/2006 |
| JP | 2015071133 | * | 4/2015 |
| JP | 2018199117 | * | 12/2018 |
| JP | 2022067073 A | | 5/2022 |
| KR | 20160109470 | * | 9/2016 |

OTHER PUBLICATIONS

Translation of JP08323313 by Takasu, published Dec. 10, 1996.*
Translation of JP11188192 by Nakano, published Jul. 13, 1999.*
Translation of JP07227587 by Sano, published Aug. 29, 1995.*
Translation of JP2018199117 by Yamamoto, published Dec. 20, 2018.*
Translation of KR 20160109470 by Yoon, published Sep. 21, 2016.*
Translation of JP2015071133 by Kajimoto, published Apr. 16, 2015.*

* cited by examiner

THREE-DIMENSIONAL VEHICLE MAT WASHER AND RELATED METHOD OF USE

BACKGROUND OF THE INVENTION

The present invention relates to vehicle mats, and more particularly to a mat washer that cleans three dimensional or contoured vehicle mats.

Vehicle mats are used in vehicles to protect the floor of vehicles under the feet of vehicle occupants. Frequently, the mats become soiled, or full of mud and dirt, and must be cleaned. To do so, a user typically will remove the mats from the vehicle, affix them to holder, and spray them with water, sometimes pressurized water if the user has access to a pressure washer. If not, the user will also use a brush and manually brush the mat to remove any stubborn dirt and debris on the mat. While this manual method of washing mats works, it is time consuming and labor intensive.

Accordingly, there remains room for improvement in the field of washing vehicle mats, and in particular three dimensional vehicle mats.

SUMMARY OF THE INVENTION

An apparatus is provided to automatically clean a vehicle mat, and can include one or more compliant rollers that cooperatively grab and advance the vehicle mat toward one or more brushes that scrub debris from above and/or below the mat.

In one embodiment, the vehicle mat can be a semi-rigid, three-dimensional mat including a floor substantially conforming to a floor of a vehicle foot well and at least one wall integrally formed with the floor and extending upward from the floor at a first angle. In some cases, the wall can be a forward wall integrally formed with the floor extending upward from the floor at the first angle. In other cases, the wall can be a side wall integrally formed with the floor extending upwardly from the floor along a side of the mat, substantially conforming to a foot well wall. One or more walls can be joined with the floor of the mat by a curved transition. Due to one or more of these features, the mat can have a bulky, abnormal and/or contoured shape.

In another embodiment, the one or more compliant rollers can deform a distance radially toward an axis of rotation when contacting the mat to accommodate the contoured three dimensional shape of the mat and still grab the mat for advancing, optionally altering the first angle to a second angle different from the first angle and/or flattening the curved transition.

In still another embodiment, the apparatus can include first and second brushes that rotate in opposite directions. The mat can be fed between these brushes so they simultaneously engage the mat from above the vehicle mat and below the vehicle mat, to scrub debris from the vehicle mat while moving along a first pathway, optionally altering the first angle to a second angle different from the first angle and/or flattening the curved transition.

In yet another embodiment, the apparatus can include a deflector that deflects the vehicle mat downstream of the brushes to a second pathway different from first pathway. The deflector engages the vehicle mat to bend at least one of the floor and the wall, optionally altering the first angle to a second angle different from the first angle and/or flattening the curved transition.

In even another embodiment, the apparatus can include a holding pan that receives and supports the mat so it is accessible through a second opening below the brushes and a first opening of a frame that supports the rollers and brushes. The deflector can be included to reroute the mat downstream of the brushes along a pathway toward the pan.

In a further embodiment, the one or more brushes can rotate at a greater RPM than the compliant rollers to exert a tension on a first portion of the vehicle mat between the brushes and the compliant rollers. A second portion of the vehicle mat beyond the brushes is not under the tension. The tension can allow the brushes to rotate relative to the surfaces of the mat to provide a scrubbing action, rather than simply move at the same tangential speed as the surfaces, which may not provide any scrubbing action to those surfaces.

In still a further embodiment, a method of washing a vehicle mat is provided. The method can include providing a vehicle mat including a floor substantially conforming to a floor of a vehicle foot well and a wall integrally formed with the floor of the mat and extending rigidly upward from the floor at a first angle; advancing the vehicle mat with a plurality of compliant rollers that are rotating under power, at least one of the compliant rollers deforming radially toward an axis of rotation when contacting and grabbing the vehicle mat; engaging the vehicle mat with a first brush to scrub debris from the vehicle mat while moving along a first pathway; and bending at least one of the floor and the wall so that the first angle changes to a second angle different from the first angle.

In yet a further embodiment, the method can include deflecting the vehicle mat downstream of the first brush to a second pathway different from first pathway. The bending can occur during the deflecting, or interaction with the rollers or brushes.

In even a further embodiment, the method can include depositing the vehicle mat on a holding pan below the first brush. The vehicle mat can include an upper surface and a lower surface. The lower surface can face upward when the vehicle mat is advanced with the compliant rollers. The lower surface can face downward when the vehicle mat is supported on the holding pan.

The current embodiment provides an apparatus and method for quick and consistent cleaning of a three-dimensional, contoured vehicle mat via an automatic system. The apparatus can effectively pull and advance the mat through the system, accommodating the various different contours and walls of the mat. The brushes can clean upper and lower surfaces of the mat simultaneously, to provide complete cleaning. The apparatus also can prevent inadvertent bunching of the mat downstream of the brushes, and can deposit the mat in a holding pan if included for easy retrieval by a user.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

Figure 1:
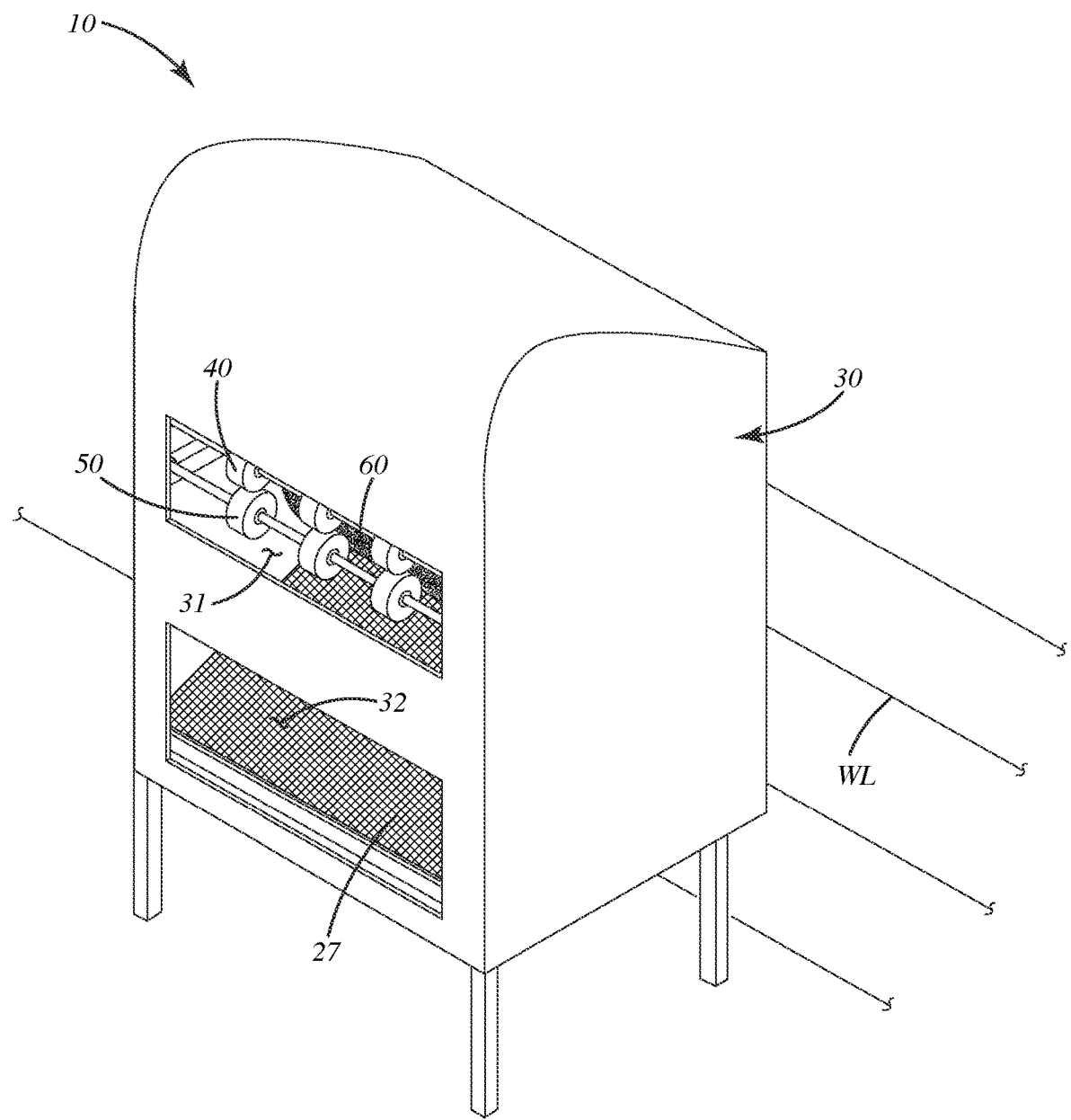
FIG. 1 is a perspective view of the mat washer of a current embodiment installed adjacent a wall of a structure.

A current embodiment of the vehicle mat washer is shown in FIGS. 1-5 and generally designated 10. The mat washer 10 can include a frame 20 and enclosure 30, one or more sets of compliant rollers 40 and 50, and one or more brushes 60 and 70. The compliant rollers 40 and 50 can intake the vehicle mat 100 described below, advance the mat toward the one or more brushes 60 and 70, and can operate in conjunction with the brushes to satisfactorily feed the vehicle mat through the brushes to remove debris from the vehicle mat 100, for example, both the upper 100U and lower surfaces 100L as described below. The rollers can grab the mat 100 and pull it into the washer 10, advancing it toward the brushes. Optionally, the brushes can spin at a faster rate than the rollers 40 and 50 and scrub debris from the upper and/or lower surfaces of the mat 100, due to the mat advancing at a slower rate than the tangential speed of the outermost surfaces of one or more of the brushes.

In advancing from the rollers to the brushes, the mat 100 can travel on a first pathway P1, which can generally be a linear pathway between those elements. Optionally, the mat washer 10 can be constructed to fit within a confined space, where it can be placed up against a wall WL (FIG. 1) that is part of a larger structure, such as a building. As such, the washer 10 can be configured to deflect the mat along a second pathway P2 and/or a third pathway P3 back toward the user after cleaning along a first pathway P1. For example, that washer 10 can include the enclosure 30, in which the user initially places the mat 100. The mat can proceed through the rollers, brushes and deflectors, as described below, to be deposited on a holding pan 27 as described below. The holding pan 27 can be accessible through the second opening 32 so that a user can retrieve the clean mat 100 through the opening 32. Further optionally, the first opening 31 can be disposed above the second opening 32. Of course, in other applications, where the washer 30 includes a more singular or linear pathway, the openings 31 and 32 can be aligned with one another but on opposite sides of the closure 30. The enclosure 30 can be constructed from multiple panels which conceal the internals and the frame 20 of the mat washer 10.

Figure 2:
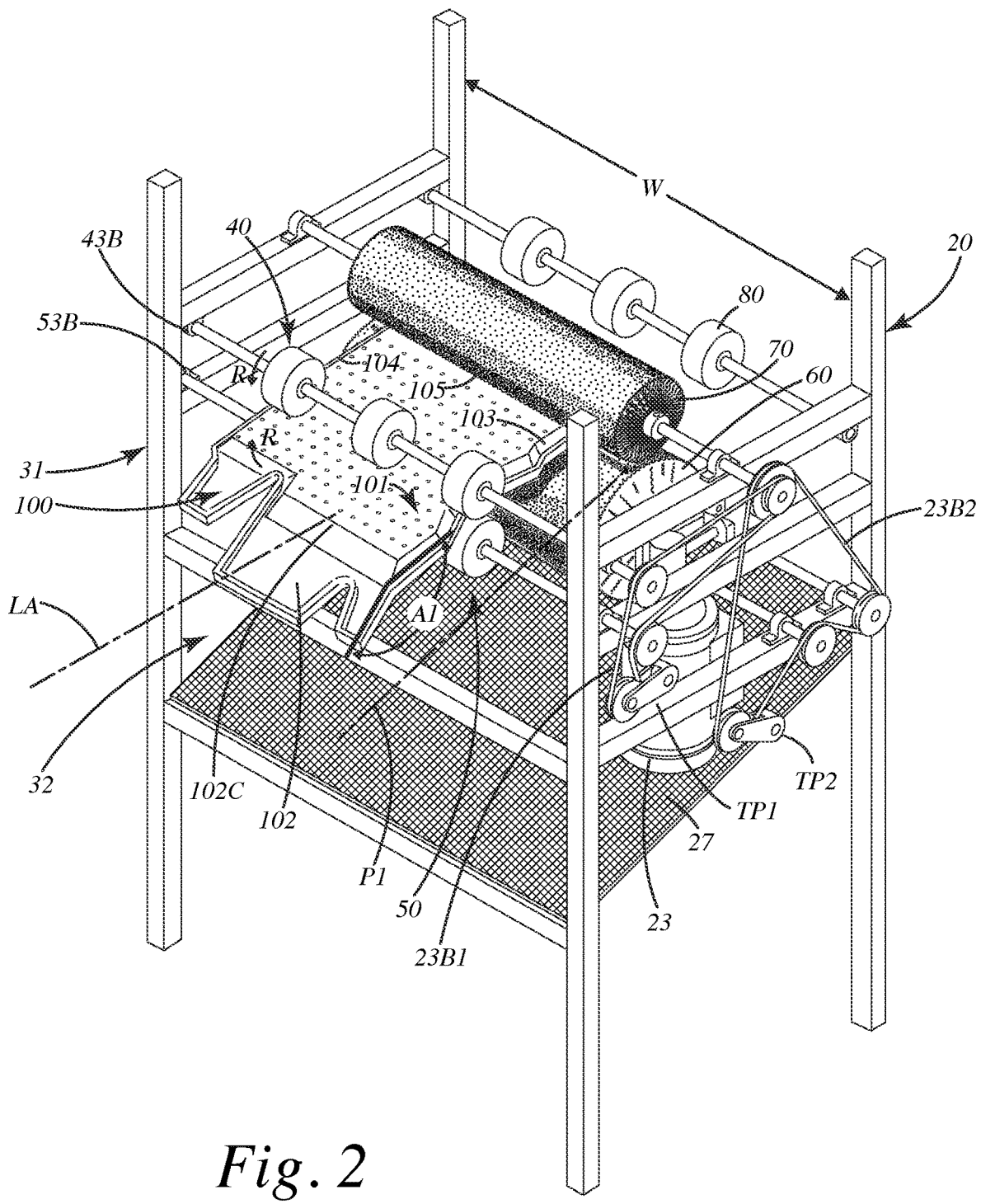
FIG. 2 is a perspective view of the mat washer with a three dimensional mat being inserted between sets of compliant rollers as the rollers grab and initially advance the mat.

Generally, the mat washer 10 can clean, wash, treat, scrub, modify or otherwise modify (all referred to as scrub herein) a vehicle mat 100 to remove debris from that mat. The vehicle mat 100 optionally can be a three-dimensional, contoured vehicle mat that is designed or configured to fit within a vehicle floor well. The vehicle mat 100, as shown in FIG. 2, can include a floor 101 upon which a vehicle occupant's feet can be disposed when the vehicle mat 100 is in a vehicle foot well. The floor can substantially conform to that vehicle foot well and can be of a similar shape and outline. The vehicle mat 100 can include a forward wall 102 integrally formed with the floor 101 and extending upwardly from it. The forward wall 102 can be disposed at an angle A1 relative to the floor 101 when the mat 100 is in a normal, uncompressed or un-tensioned state, for example, when the mat is in a vehicle foot well or generally sitting on a flat surface removed from the vehicle. The first angle A1 can be a static angle that is maintained in the mat without any outside forces acting on the mat, due to the mat's rigidity and contours molded into it. The angle can be optionally between 5° and 175°, inclusive, between 10° and 110°, inclusive, between 15° and 75°, inclusive, between 20° and 45°, inclusive, or other angles, depending on the vehicle well into which the mat is to be placed. The forward wall can be configured to be disposed under one or more brake or acceleration pedals of the vehicle and can be disposed generally forwardly of the floor 101. The forward wall 102 as shown can be split into one or more different individual walls or panels that are separated or spaced from one another as shown, but that optionally can be contiguous and integrally formed with one another.

The forward wall 102 can transition to the floor 101 at a curved transition 102C, which can be rigid enough to retain the angle A1 between the remainder of the floor 101 and the wall 102. The mat 100 optionally can include one or more side walls 103 integrally formed with the floor 101 and extending upwardly from the floor 101, distal from at least a portion of the forward wall 102 and substantially conforming to a foot well wall. The side wall 103 can be joined with the floor 101 via a curved transition 103C. The side wall 103 can project forwardly and can transition to a portion of the forward wall 102. In some cases, the mat can include additional sidewalls, for example, and opposing sidewall 104 that lays across the longitudinal axis LA of the mat. The mat 100 can include a rear sidewall or rear wall 105 distal and opposite from the forward wall 102, which can lay in a position, when installed in the vehicle, behind an occupant's feet. In some applications, the forward wall, sidewalls and rear walls and floor can form a tray that can capture and retain dirt, mud, snow, water and other debris from a user's feet therein, preventing it from leaking to a vehicle foot well and any carpet or other material disposed therein.

The mat 100 can be constructed from a polymer, and can be semi-rigid and can hold its shape in a three-dimensional form when removed from the vehicle well. Each of the walls can extend upward from the floor and can be disposed in a non-planar orientation relative to the floor. The walls can be generally self-supporting due to the semi rigid or rigid character of the mat. Due to the various walls extending upward from the floor, the mat can be difficult to process or wash due to its unwieldy, bulky and irregular shape and size. The mat washer 10 herein can be configured so that the mat is not permanently deformed, torn or damaged so that it no longer fits the vehicle foot well.

Figure 3:
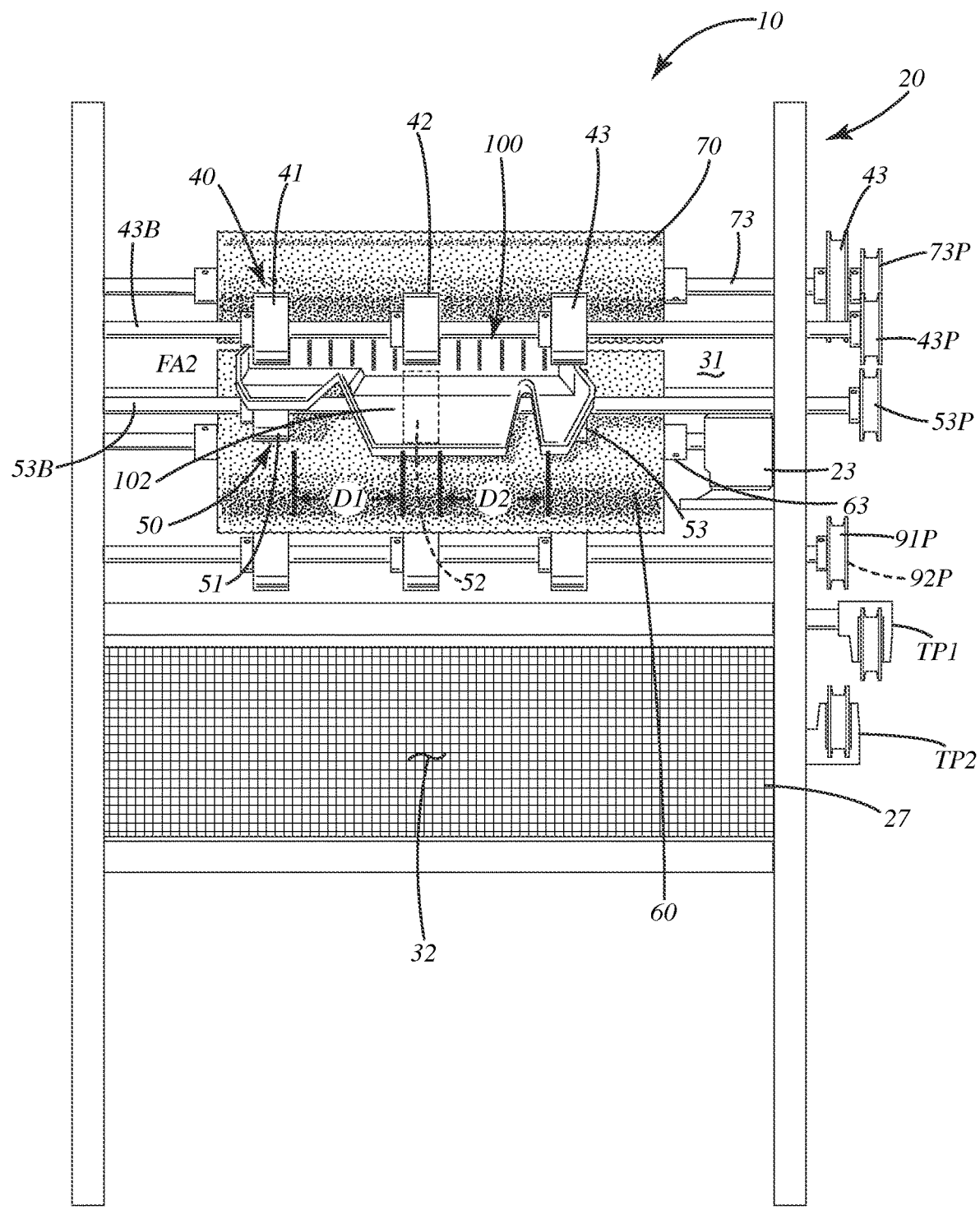
FIG. 3 is a front view thereof.

With reference to FIGS. 1-5, the particular components of the mat washer 10 will now be described in further detail. The washer 10 can include a frame 20. The frame 20 can include multiple upright vertical supports in corners that support horizontal support bars which will not be described in detail here. The frame 20 can support a motor 23 which can drive and rotate the various rollers, brushes and deflectors as described below. The particular drive mechanism as shown can include multiple belts 23B1, 23B2, etc., which engage multiple pulleys, for example pulleys 43P, 53P, 73P, 91P, 92P to rotate the respective first and second compliant rollers 40, 50, as well as the second brush 70 and rollers 91, 92 as described below. As shown in FIG. 3, the motor 27 can include a direct drive shaft 63 that rotates the first brush 60, but of course, that brush and other elements could be driven in other manners, depending on the application.

Optionally, the first brush 60 can rotate at a faster RPM than the compliant rollers 40 and 50 to promote or exert a tension T in the mat 100 when located between the compliant rollers 40 and 50, the first brush 60, and optionally the second brush 70. This can be shown in with reference to FIGS. 4-5. There, a tension T is exerted and the portion 100P1 of the mat 100 that is between the compliant rollers 40 and 50 as well as the brushes 60 and 70. That portion 100P1 can be under a tension T optionally of at least ¼ pound per square inch, at least ½ pound per square inch, 1 pound per square inch, or other tensions depending on the application and the desired scrubbing of the mat 100. Between the respective rollers 40 and 50, and the brushes 60 and 70, the portion 100P1 can be substantially planar, as it is being stretched out in a linear manner between the points of contact at the rollers and the brushes. That portion 100P1 optionally does not curve, dip or sag between those elements.

As mentioned above, the frame 20 can support the first set 40 and second set 50 of compliant rollers. These rollers can be supported on a bar 43 and 53 that extend across the width W of the frame. The rollers can grab and advance the mat 100 when the mat 100 is placed adjacent to the opening 31. Each of the compliant rollers 40, 50 can be in sets of individual rollers or roller units. For example, the first set of rollers 40 can include a first roller 41, a second roller 42 and a third roller 43, also respectively referred to as a primary roller, an intermediate roller, and a secondary roller of the first set. The second set of rollers 50 can include a first roller 51, a second roller 52 and a third roller 53, also respectively referred to as a primary roller, an intermediate roller and a secondary roller of the second set. Optionally, the number of independent and separate rollers can vary depending on the application and the grip to be applied to the mat 100.

The rollers of each of the respective sets can be separated respective distances D1 and D2 from one another. For example, the primary roller 41 can be separated from the intermediate roller 42 by the distance D1, and the intermediate roller 42 can be separated from the secondary roller 43 by the distance D2. The distances D1 and D2 can be equal. The same can be true for the primary, intermediate and secondary rollers of the second set of rollers 50. By separating the independent roller units 41, 42 and 43 from one another along the bar 43, each of the independent roller units 41, 42 and 43 can independently grip and dynamically compress, collapse or react relative to the interaction of that individual roller unit with the contours and shapes of the three-dimensional mat 100. Each of the rollers optionally can be aligned vertically with one another. For example, the primary rollers 41 and 51 of the different roller sets can be aligned one above the other to provide a pinching or gripping action therebetween on the mat 100. Likewise, the intermediate and secondary rollers also can be aligned from one set to the next.

Optionally, the rollers 40 and 50 are not formed of a continuous roller unit that extends across the entire width of the mat 100. Instead, the rollers form an interrupted and discontinuous force application zone FAZ that applies pressure via each of the separate rollers units 41, 42, 43 and 51, 52, 53 separately and independently to the mat. With this type of separated and discontinuous force application zone FAZ, the rollers optionally can conform more easily to the varying contours of the mat. Of course, in some alternative applications, the rollers can be constructed of a continuous unit that extends across the width of the opening 31 and the frame as a single, unitary drum-type roller, rather than separated into individual roller units as shown. In this application, the compliant rollers can be configured to deform as described herein to effectively handle the contours of the three-dimensional mat, yet still grip and grab that mat to advance it along the pathway P1.

Figure 7:
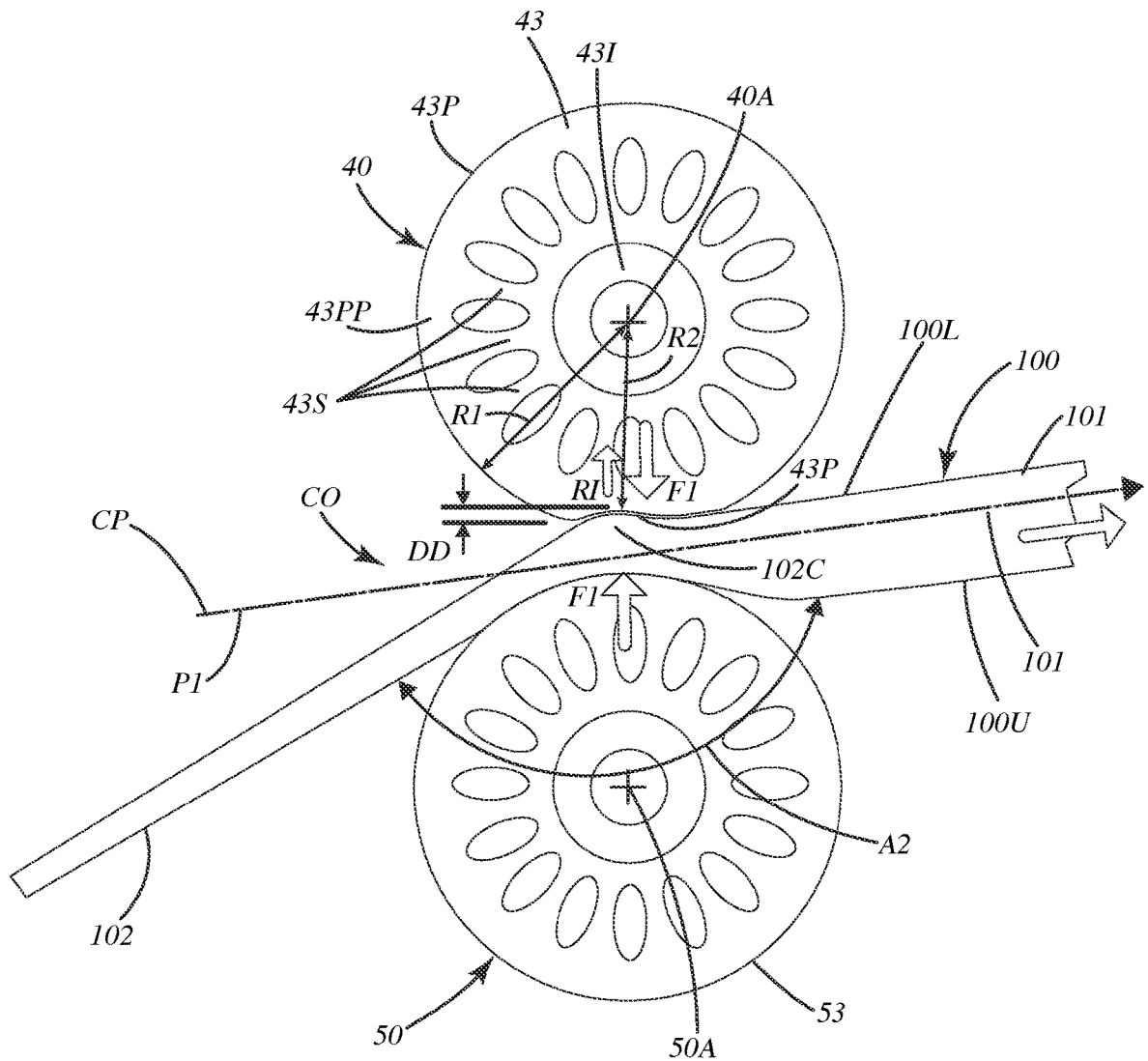
FIG. 7 is a close-up view of the mat being compressed between the compliant rollers to change the first angle of the wall relative to the floor panel of the mat, and with at least one compliant roller deforming toward an axis of rotation of the roller.

The compliant rollers 40 and 50 as described herein can rotate about the respective bars 43B and 53B as described above. The rollers also can rotate about the respective axes of rotation 40A and 50A respectively. As shown in FIG. 7, each of the compliant rollers can include multiple spokes and an outer perimeter. For example, the roller unit 43 can include multiple spokes 43S that connect an inner portion or hub 43I, which circumferentiates the axis 40A, to an outer perimeter portion 43PP, which extends to an outer perimeter 43P of that roller unit 43. The roller itself can be constructed from a compliant material, such as rubber, nitrile, neoprene, foam, ethyl vinyl acetate, thermoplastic polyurethane, silicone or other materials. The spokes 43S can extend from and connect the inner hub 43I with the perimeter portion 43PP around the axis 40A. The hub, spokes and perimeter portion all can be integrally and monolithically formed of the same material that extends homogeneously through these elements. Of course in other applications, these elements can be separately constructed and not integral, but rather glued, fastened, secured or otherwise attached to one another.

The spokes 43S can be thin and deformable, which can allow them and their outer perimeter 43P to deflect or deform radially toward the axis of rotation 40A, as shown in FIG. 7. There, a portion of the curved transition 102C of the mat 100, which can be semi rigid, can engage the outer perimeter 43P of the roller 43. As a result, that perimeter surface 43P can move radially inward in direction RI generally toward the axis of rotation 40A of the roller. In doing so, the outer perimeter, spokes and/or the roller 43 can slightly deform, deflect, move or otherwise become modified and move in that direction RI. It will be appreciated that the other rollers 41 and 42 of the first roller set 40, as well as the individual roller units of the second roller set 50, also can deform in a similar manner, being constructed similarly to the roller unit 43 as described above.

Depending on the particular contours of a particular vehicle mat, the deflection can be greater or less than that shown in FIG. 7. For example, where the contour 102C, which as shown can be a curved transition (but can be of any other three-dimensional contour of the mat), contacts the outer perimeter 43P, that outer perimeter can move in direction RI or deform, such that the outer perimeter 43P moves a distance DD toward the axis 40. When the perimeter 43P deforms and moves toward the access 40A, the radius R1 of the roller 40 can be reduced to a second, lesser distance or radius R2 as the outer perimeter deforms. The distance DD by which the compliant roller deforms can be at least optionally at least ⅛ inch, at least ¼ inch, at least ½ inch, at least ¾ inch, at least 1 inch, at least 1½ inches, or other distances depending on the durometer and compliance of the rollers, and/or the rigidity and/or contours of the vehicle mat.

Of course, after the perimeter no longer contacts the contour 102C, the outer perimeter 43P can automatically deform or extend outward again, away from the axis 40A, so that the radius R1 is reestablished at the location where the outer perimeter 43P was temporarily deformed. This process of deforming the rollers can be repeated multiple times for various contours of the mat, and as described above, also can transfer forces from the compliant rollers to the mat itself, causing the mat to bend, deform, deflect or otherwise become slightly modified when engaging the respective rollers, as well as the brushes or deflectors as described below.

As shown in FIG. 7, the first and second compliant rollers 40 and 50 can exert a force F1 on the mat 100. This force F1 can be a compressive force so that the mat is compressed within an optional opening CO between the two sets of rollers. This compressive force can bend a portion of the mat 100. As shown, the mat 100 passing between the rollers 40 and 50 can be engaged by the force F1. This in turn can change the angle A1 to a different, for example, greater or lesser, angle A2 between the forward wall 102 and the floor 101 of the mat. Optionally, this can move at least one of the forward wall 102 and/or the floor 101 toward a common plane CP. If there are any curved transitions, for example, a contour 102C, the compressive force F1 optionally can compress, modify or flatten slightly that curved transition or contour 102C, which in some cases can alter the previous angle A1 to a different angle A2 between the floor and one or more of the walls of the mat.

As mentioned above, the first set of compliant rollers 40 can rotate in a first direction R1 and the second set of compliant rollers 50 can rotate in a second direction R2, which can be opposite the first direction R1. With these opposite rotational characteristics, the rollers can grip the respective lower surface 100L and upper surface 100U of the mat 100 and advance it along the pathway P1 away from the opening 31 toward the brushes 60 and 70. The first brush 60 can rotate in a direction R3 which can be different from a fourth direction R4 in which the second brush 70 rotates. The first brush 60 can have a greater brush diameter DB1 then a brush diameter DB2 of the second brush 70 as shown. Of course, in other applications, these diameters can vary depending on the desired scrubbing action on the respective vehicle mat. The first brush 60 can rotate in direction R3 at a greater RPM than the second brush 70. For example, the first brush 60 can rotate at an RPM that is RPMG, which can be optionally at least 10 RPMs, optionally at least 10 RPMs, at least 20 RPMs, at least 50 RPMs, at least 100 RPMs, at least 150 RPMs greater than the RPM that is the RPML of the second brush 70, shown in FIG. 9, as well as the RPMs of the first set of rollers 40 and second set of rollers 50.

Again, this difference in RPMs of the first brush 60 relative to the RPMs of the compliant rollers 40 and 50, which grab and hold the mat, allows the first brush 60 to quickly rotate at a fast enough rate to scrub and clean the mat, instead of allowing the first brush to actually advance the mat quickly through or past the brushes 60 and 70. The first brush thus scrubs and moves over the surfaces of the mat, rather than pulling it, while the rollers advance the mat toward the brushes as they grab the mat. The first brush 60 also can rotate at a greater RPM than the compliant rollers to exert a tension T on a first portion 100P1 of the vehicle mat between the compliant rollers and the first brush. A second portion 100P2 of the vehicle mat beyond the first brush, however, optionally is not under the tension T.

Figure 6:
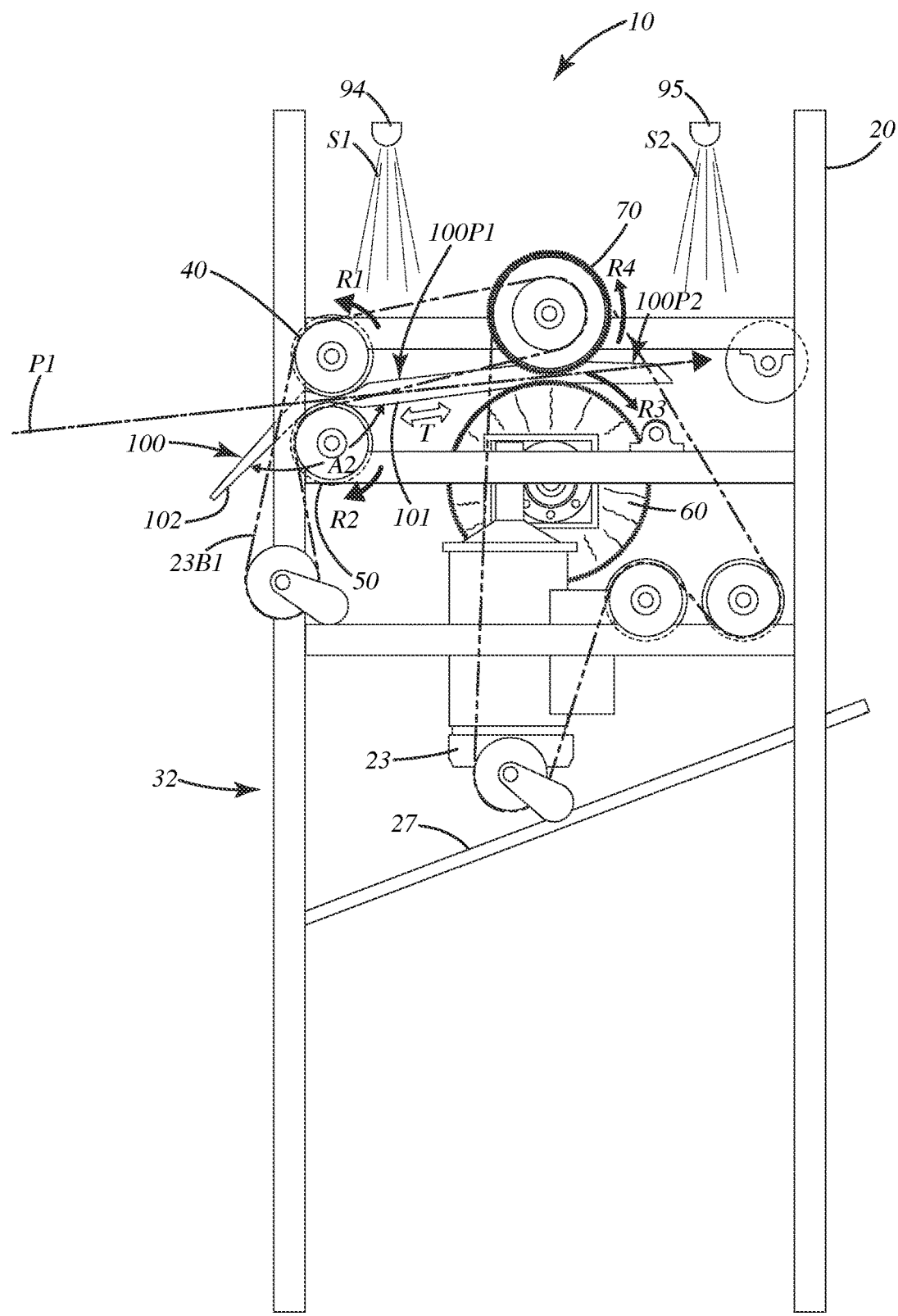
FIG. 6 is a side view the mat washer with the mat being compressed between the compliant rollers to change a first angle of a wall relative to a floor panel of the mat, and with the mat projecting between bushes that scrub debris from the surfaces of the mat, which is travelling along a first pathway.

For example, as shown in FIG. 6, the mat 100 is advanced along the pathway P1. The portion of the mat 100P1 between the rollers 40, 50, and the brushes 60, 70 can be under the tension T. The portion 100P2 of the mat that extends beyond the first 60 and second 70 brushes optionally can be under no tension. In that portion 100P2, there optionally can be no external forces between the brushes 60, 70, and some other component that produces a tension in that portion 100P2. Thus, when moving along the pathway P1, the mat 100 can include a first portion 100P1 that is under tension, and a second portion 100P2 that is not under any tension, downstream of the brushes 60, 70. Of course, when that second portion 100P2 encounters another element of the washer 10, it may or may not be placed under tension.

Figure 5:
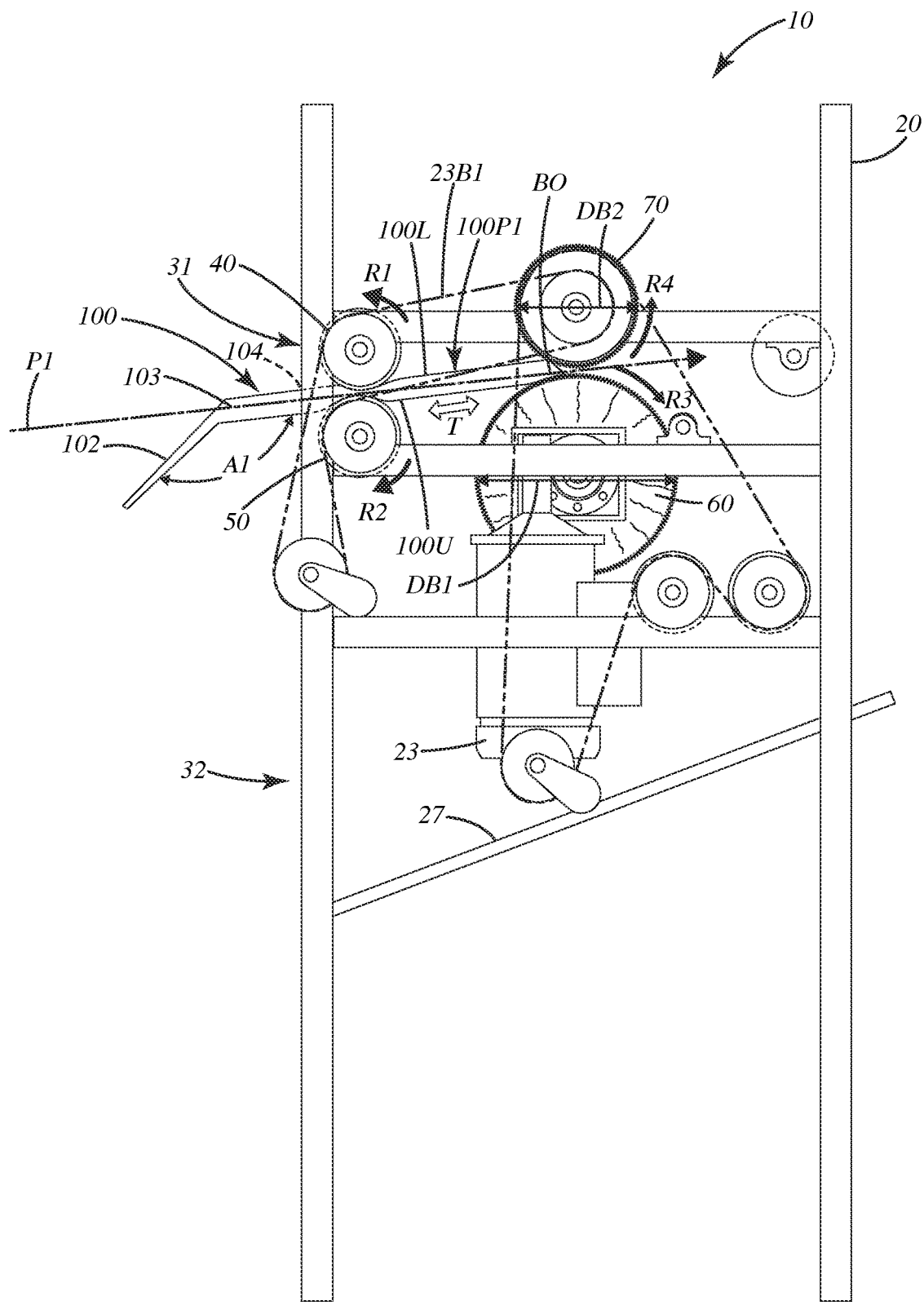
FIG. 5 is a side view thereof.
Figure 9:
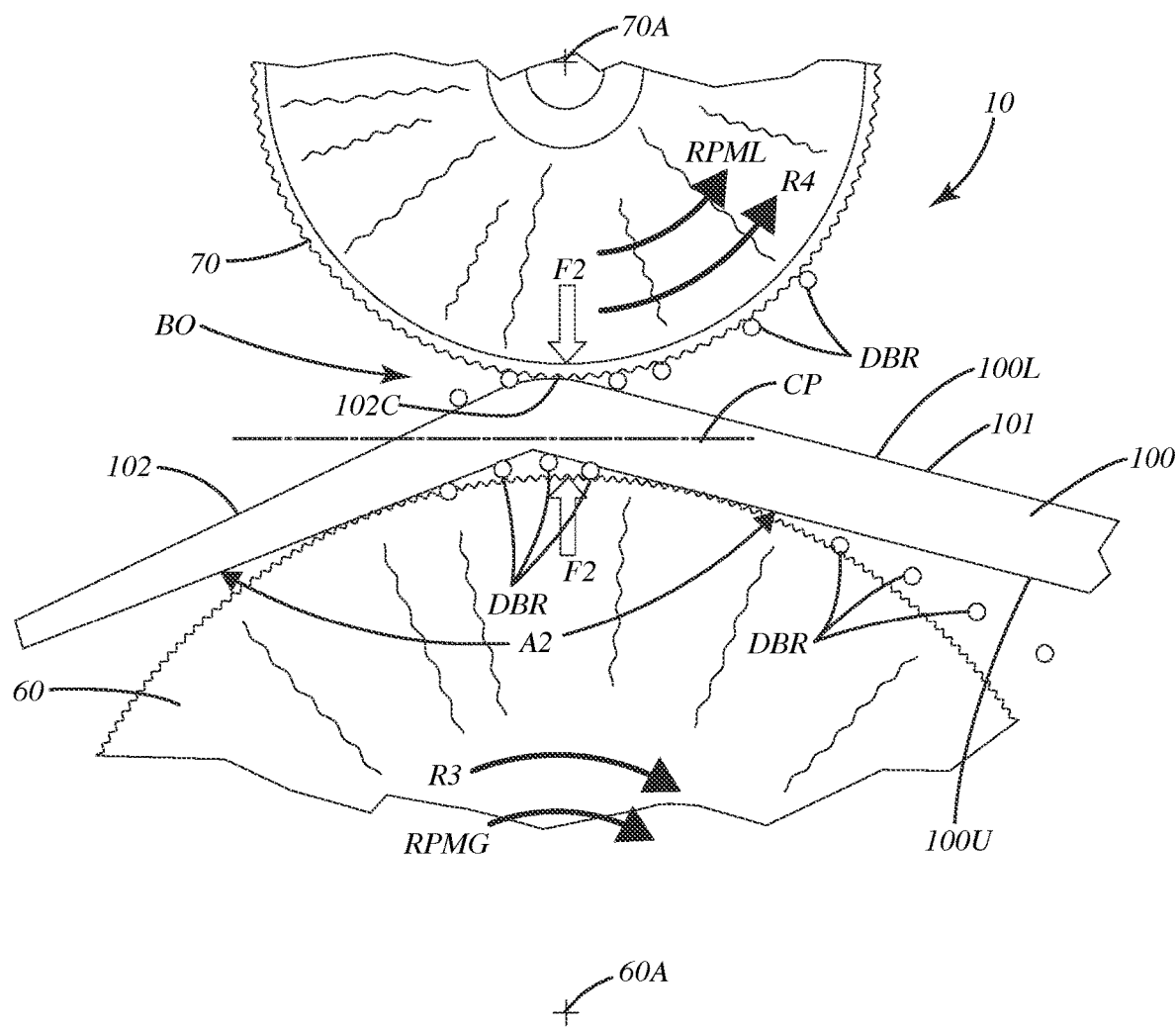
FIG. 9 is a close-up view of the mat being compressed between the brushes to change the first angle of the wall relative to the floor panel of the mat.

With reference to FIGS. 5 and 9, the first and second brushes 60 and 70 can be constructed to include multiple bristles. These bristles can be in the form of elongated or rigid fibers, strands, straws, pieces of fabric, pieces of nylon or other materials. The bristles can project outward from the respective axes of rotation 60A and 70A of the respective brushes. The brushes can directly contact one another, or can form a brush opening BO along the pathway P1. The brush opening BO can be optionally less than two inches, optionally less than one inch, optionally less than ½ inch or other dimensions depending on the scrubbing action of the brushes on the upper and lower surfaces of the mat 100.

Optionally, the bristles of the brushes can engage the respective upper 100U and lower 100L surfaces of the mat 100, or other surfaces thereof, and can engage pieces of debris DBR, effectively scrubbing or removing the debris from the mat, transporting it along the bristles away from the mat as shown in FIG. 9. This engagement of the mat with the first brush 60 and the second brush 70 can be simultaneous, so that those brushes can simultaneously engage the vehicle mat from above the vehicle mat and from below the vehicle mat to scrub the debris while moving on the first pathway P1. As used herein, debris can be any dirt, mud, particulate matter, waste, water, liquids or other materials. As also used herein, scrub can refer to any mechanical or cleaning action that removes, loosens or reduces debris from one or more surfaces of the mat 100, whether in contact with the mat or not.

In some cases, the first brush 60 and second brush 70 of the mat washer 10 can engage the mat with a compressive force F2 therebetween. This compressive force or other force depending on the direction of the force F2, can push against the floor and/or the walls of the mat 10 to alter, bend or otherwise change the shape and or relationship of the walls and floor relative to one another. For example, as shown in FIG. 9, when the force F2 is applied by the brushes on the mat 100, that force F2 can change the original angle A1 between the forward wall 102 and the floor 101 to a second, greater angle A2 between those elements. Of course, the angle A1 alternatively could become a lesser angle A2, depending on the application and type of force applied. The force F2 between the brushes also can flatten out or modify any curved transition or other contour, for example 102C, between the floor and the walls. Further optionally, the wall 102 and floor 101 can be compressed toward a common plane so that the first angle A1 changes to the second angle A2 as shown in FIG. 9.

Figure 4:
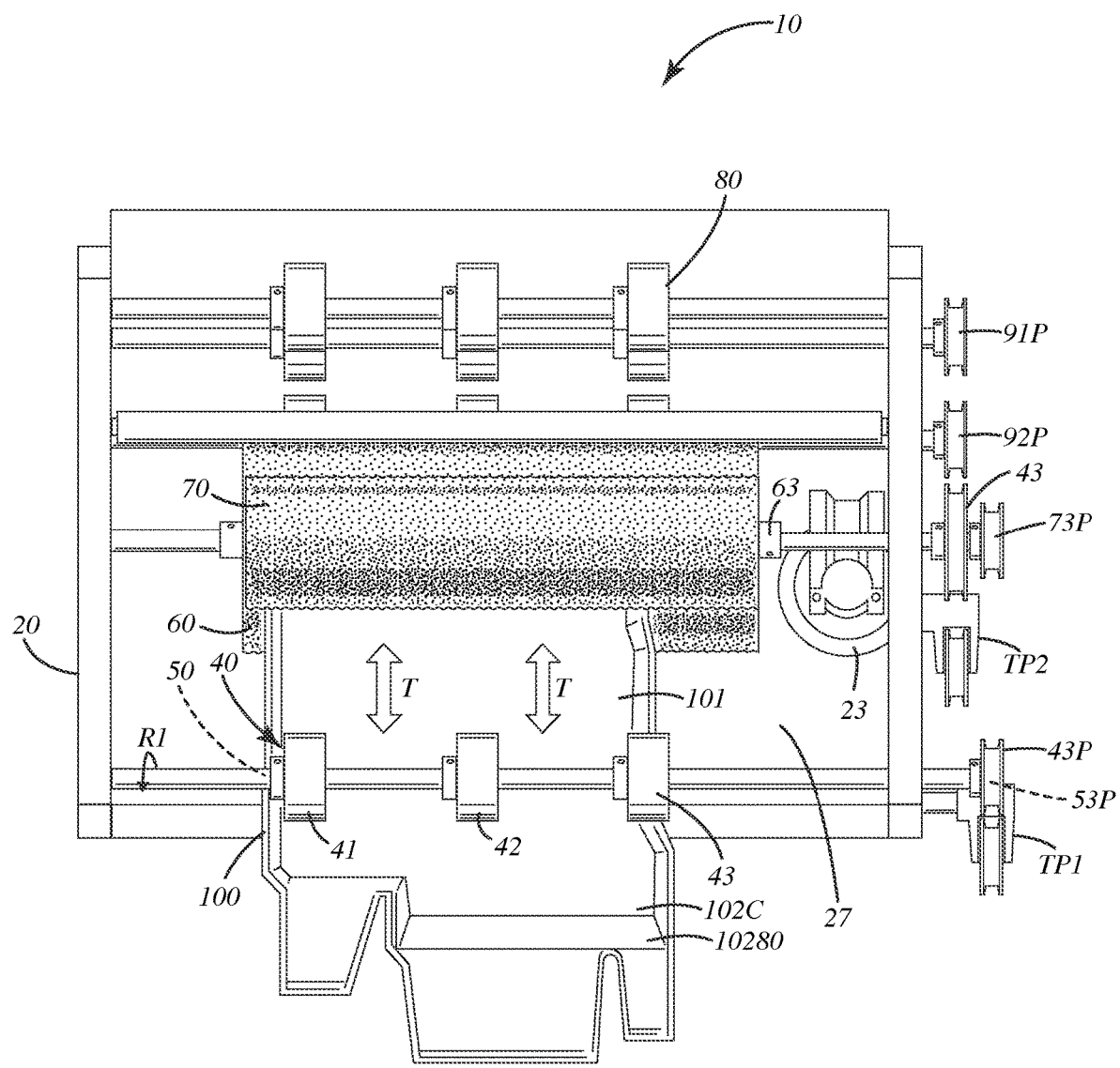
FIG. 4 is a top view thereof.
Figure 8:
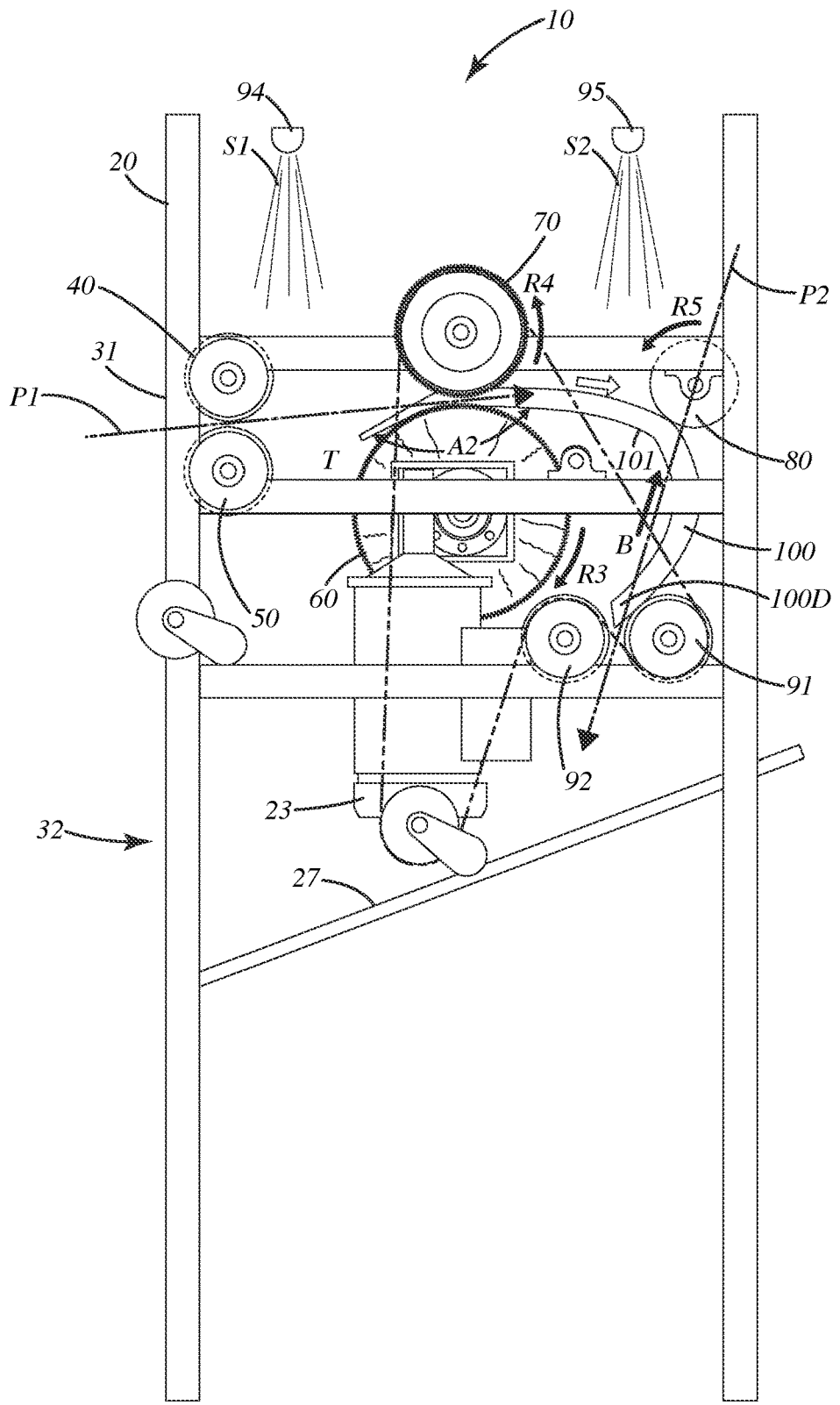
FIG. 8 is a side view of the mat being compressed between first and second brushes to change the first angle of a wall relative to the floor panel of the mat, and with the mat being deflected by a deflector along a second pathway different from the first pathway.

Optionally, where the mat washer 10 is configured to redirect the mat from the first opening 31 to the second opening 32, which is located below the first opening 31, as shown in FIGS. 1 and 8, the mat washer 10 can include one or more deflectors 80. As shown in FIGS. 2, 4 and 8, these deflectors optionally can be in the form of additional compliant rollers, similar to the rollers 40 and 50 described above. These deflectors optionally can be powered by the motor 23 to rotate in a direction R5 to further direct the mat 100 downward to an additional set of rollers 91 and 92 along a second pathway P2. This second pathway P2 can extend in a second direction different from, and transverse to, the first pathway P1. Optionally, the deflector 80 can engage the mat 100 to bend the mat downward in a direction as shown in FIG. 9, and advance it toward the additional compliant rollers 91 and 92 so that those rollers can feed the mat toward the holding pan 27. In some cases, the deflector 80 can be optionally replaced with a panel 80P, shown in broken lines in FIG. 11, which can be bent or curved toward the rollers 91 and 92.

When the mat encounters a deflector, the mat can be deflected downstream of the first and second brushes 60 and 70 to a second pathway P2 different from the first pathway P1. During this deflecting, the mat optionally can bend, deform otherwise and become modified as shown at B in FIG. 8. The mat 100 also can be modified so that when the deflector engages the mat, it bends at least one of the floor and the walls of the mat so that the first angle A1 changes to a second angle A2, which again is different from the first angle A1. The second angle can be greater than the first angle. Further, when it bends, the distal portion 100D of the mat can project along the pathway toward an opening between the first and second rollers 91 and 92. The rollers ultimately can grab the mat and advance it toward the holding pan 27 along the pathway P2. This is shown further in FIG. 10. There, the distal end 100D of the mat 100 has been advanced by the rollers 91 and 92 toward the holding pan 27. In some applications, at this point, the directions of rotation of the brushes 60 and 70 can be reversed. For example, the direction of rotation R3 of the first brush can be altered to an opposite direction R6. This reversing of the direction of the brush optionally can impair or prevent the mat 100 from becoming bunched in case the proximal end 100P of the mat stays engaged with the brush 60. Sometimes, if this occurs, the proximal end 100P can be bent toward the floor 101 and can bind or bunch the mat in the mat washer 10 so that it can become stuck, not advancing any farther through the washer.

Figure 10:
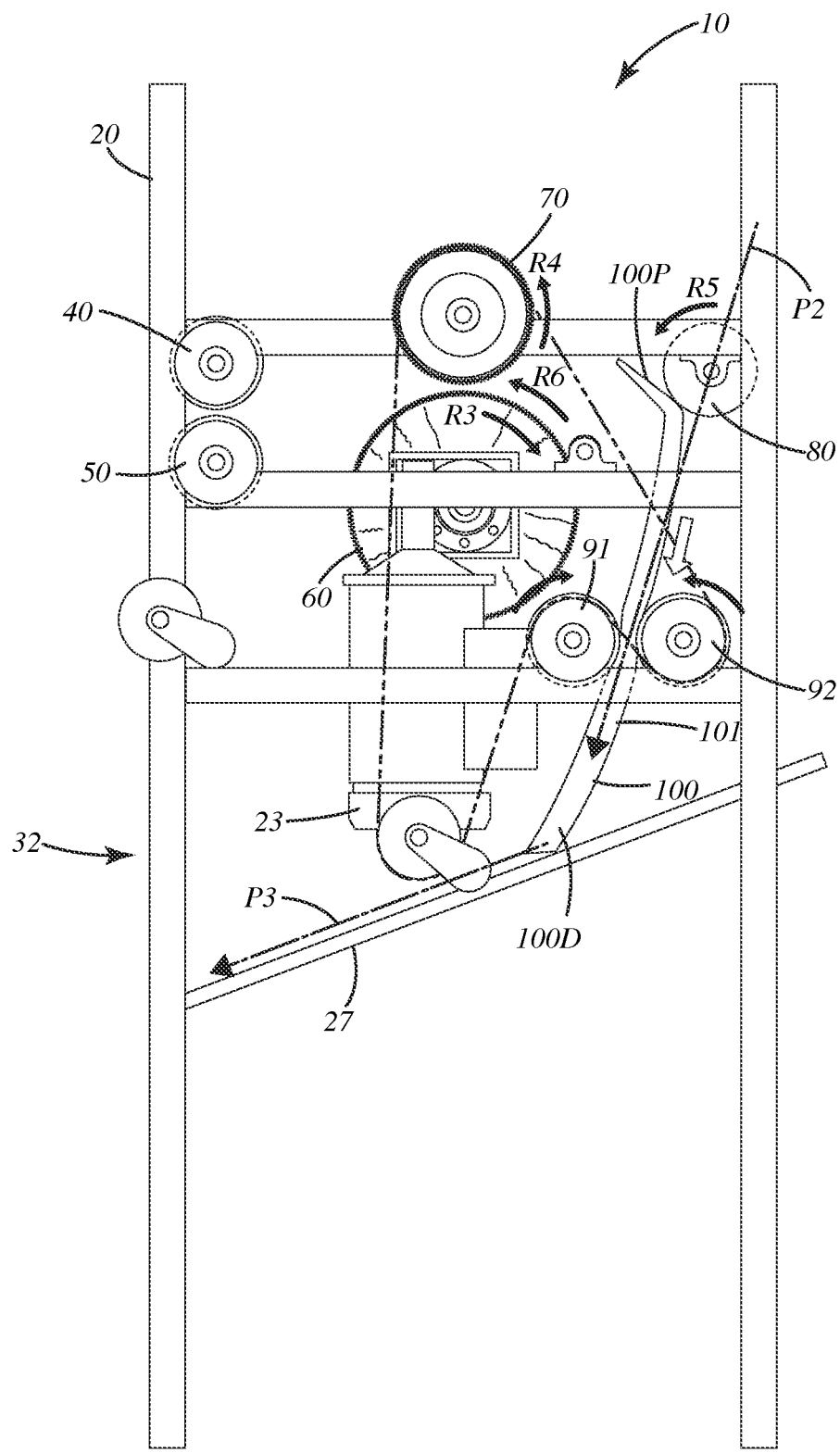
FIG. 10 is a side view of the mat being advanced by secondary rollers toward a holding pan along a third pathway, different from the second pathway.
Figure 11:
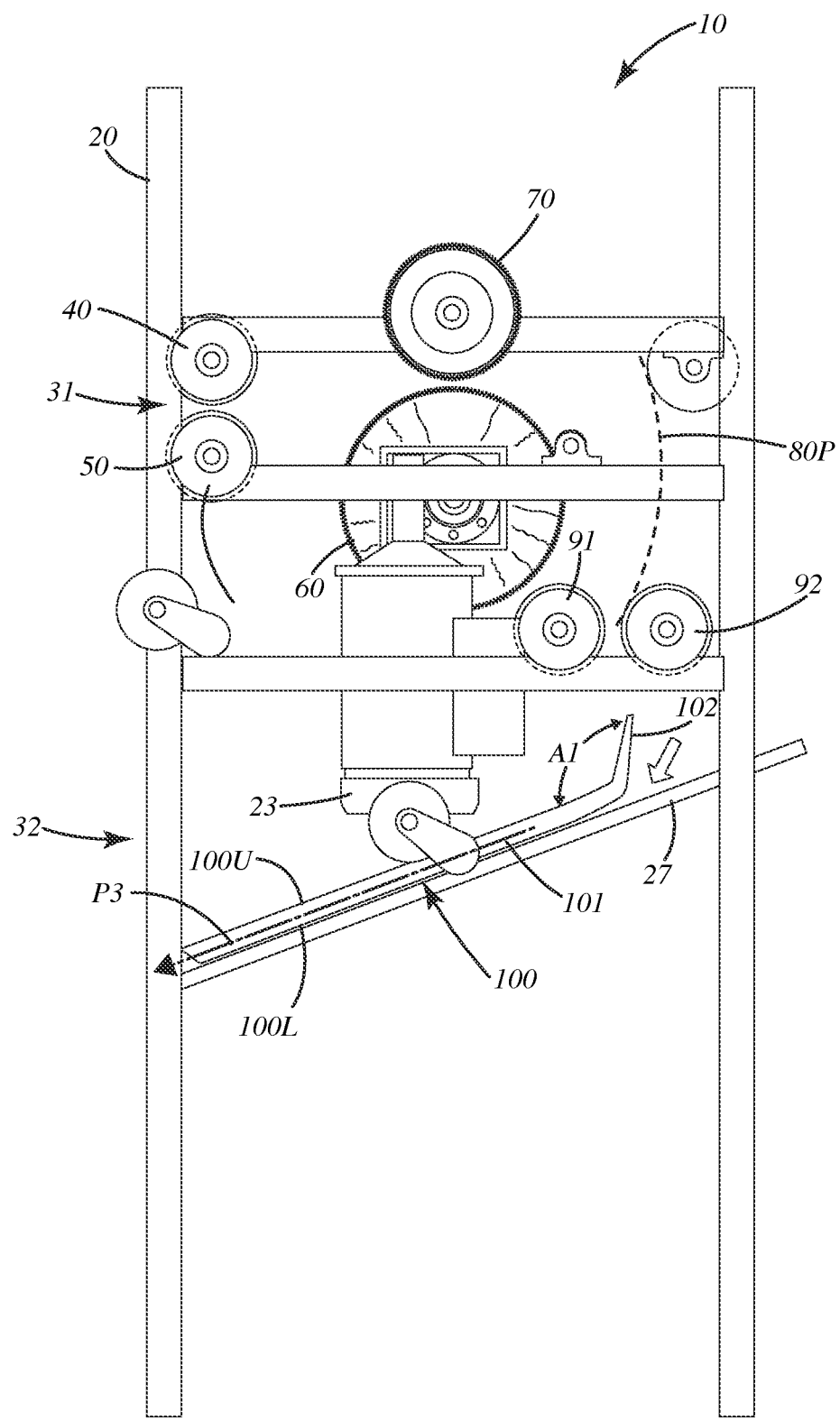
FIG. 11 is a side view of the mat deposited on the holding pan and readied for removal from the washer.

FIG. 10 shows where the mat 100 transitions to the holding pan 27 and travels along a third pathway P3 that is transverse to the second pathway P2. As shown in FIG. 11, the mat 100 can travel along the pathway P3 and the holding pan 27 toward the second opening 32. From that opening 32, a user can gain access to the mat 100 and remove it from the holding pan 27 and generally from the mat washer 10. The holding pan 27 can be disposed below the first brush 60 and the second brush 70, as well as the compliant roller sets 40 and 50. It will be noted that when the mat is deposited on the holding pan 27, the mat 100 can be supported by the holding pan so that the upper surface 100U of the mat faces upward and the lower surface 100L can face downward, which opposite the configuration when the mat 100 was first introduced to the mat washer 10 through the first opening 31 as shown in FIG. 5.

The angle between the forward wall 102 and the floor 101 can optionally return to the angle A1 of the contoured mat before being washed and the mat washer 10. As shown, the holding pan 27 can be an open mesh material so that liquids used to clean the mat 100 can impinge upon the pan and drip or drain through it. In other cases, the holding pan can be a panel or sheet, which optionally can include one or more drainage holes. In other cases, the pan can be a solid panel with no holes, depending on the application.

The mat washer 10 can include one or more sprayers 94 and 95 as shown in FIG. 6. The sprayers 94 and 95 can distribute spray patterns S1 and S2 of cleaning liquids and/or rinsing liquids onto the mat 100 as it is advanced through the mat 100 by the washer 10. As an example, the sprayer 94 can spray a first spray pattern S1 between the compliant rollers 40, 50 and the brushes 60, 70. The first spray pattern can include a cleaning solution, such as soap, cleaner or other chemicals to facilitate removal of debris DBPR from the mat. The second sprayer 95 can spray a second spray pattern S2 downstream of the brushes 60, 70 and downstream of the rollers 40 and 50. This second spray pattern S2 can be initially sprayed on the second portion 100P2 of the mat as shown in FIG. 6, and then on the remainder of the mat as shown in FIG. 8. This second spray pattern can include a rinse solution, for example, a liquid such as water or some other rinsing liquid, depending on the application. Of course, other sprayers can spray other spray patterns on the mat in various locations within the mat washer. In some cases, the spray patterns S1 and S2 can drain or drip down to the holding pan 27 and impinge on the holding pan 27 before the vehicle mat 100 actually reaches the pan 27. In other applications, the mat 100 can shield the holding pan from all or a portion of the spray patterns S1 and S2.

A method of using the mat washer 10 of the current embodiment will now be generally described. The method can include providing a vehicle mat including a floor substantially conforming to a floor of a vehicle foot well and a wall integrally formed with the floor of the mat and extending rigidly upward from the floor at a first angle; advancing the vehicle mat with a plurality of compliant rollers that are rotating under power, at least one of the compliant rollers deforming radially toward an axis of rotation when contacting and grabbing the vehicle mat; engaging the vehicle mat with a first brush to scrub debris from the vehicle mat while moving along a first pathway; and bending at least one of the floor and the wall so that the first angle changes to a second angle different from the first angle.

More particularly, as explained above, a user can insert a dirty mat in the mat washer 10 by projecting it into the opening 31 as shown in FIG. 1. The compliant rollers 40 and 50 as shown in FIG. 5 can grab the mat and advance it toward the brushes 60 and 70 as described above. The math 100 can travel along the pathway P1 in so doing and can enter the frame 20. The motor 23 can power the respective rollers 40 and 50, as well as the brushes 60 and 70. These items can rotate in the directions as described above. Optionally, the first brush 60 can rotate at faster RPMs than the rollers 40 and 50. This can exert a tension T in the portion 100P1 of the mat between the brushes and the rollers as described above. This can allow for additional scrubbing of debris from the mat by the brushes 60 and 70 as explained above.

The mat 10 can continue to be advanced along the pathway P1 as shown in FIG. 6 with a portion 100P1 under tension T, while remaining portion 100P2 is under no tension. The sprayers 94, 95 can spray the liquids in these spray patterns S1 and S2 on the mat as described above. The rollers 40 and 50 optionally can deflect or deform the mat so that it bends as shown in FIG. 7. Portions of the roller also can deflect toward the axes of rotation. As described in connection with FIG. 7, the mat 100 can continue along the pathway P1 until being deflected by deflector 80 to transition to a second pathway P2 transverse to the first pathway P1. The mat can bend after contacting the deflector as described above. As shown in FIG. 9, the mat can bend to change the first angle A1 to a second greater or generally a different angle A2 as described above.

The mat 100 can be advanced by the deflector along the second pathway P2 toward the secondary rollers 91 and 92 to transition toward the holding pan 27. The rollers 91 and 92 also optionally can bend the mat and/or change the first angle to a second angle when the mat goes between the rollers. The rollers 91 and 92 can advance the mat toward the holding pan 27 so that the mat then travels along the pathway P3 and along the holding pan toward the opening 32, where it can be accessed by user as described above.

A first alternative embodiment of the mat washer is shown in FIGS. 12-15 and generally designated 110. This mat washer can be similar in structure, function and operation to the current embodiment of the mat washer 10 described above with several exceptions. For example, this mat washer 110 can include a first set of compliant rollers 140 and a second set of compliant rollers 150 that are juxtaposed relative to one another adjacent and opening 131 of an enclosure 130. These compliant rollers can be virtually identical to the sets of compliant rollers described above, however, there can be additional individual roller units within each of roller sets, and each of the individual rollers can be placed closer to one another than in the embodiment above. The rollers 140 and 150 also can be offset relative to a first brush 160 and a second brush 170, which can be virtually identical to the embodiment described above.

In this embodiment, the first set of rollers 140 can be mounted on respective bar 143B and can rotate about an axis centered in a plane P6 that is set backward or farther away from the opening 131 than the bar 153B upon which the second set of rollers 150 is are mounted. These rollers 150 can rotate about an axis that is in the vertical plane P7, which is closer to the opening than the vertical plane P6. In this configuration, the lower or second set of rollers 150 can be the first rollers that engage and contact a respective mat 100 that is fed into the mat washer 110. In some cases, when the mat 100 is initially placed in the opening, the force of gravity can cause the distal end 100D of the mat to move toward and rest or engage the lower rollers 150. The distal part 100D of the mat 100 thus can be grabbed or advanced more easily by the lower set of rollers 150 to advance the mat toward the upper set of compliant rollers 140 and thereby fully grab the mat with both roller sets. The rollers can rotate similar to the corresponding sets of rollers 40 and 50, can be compliant and can deform like those rollers as described above. Accordingly, these rollers sets 140 and 150, as well as their individual rollers, bars and drives will not be described again in detail here.

Figure 14:
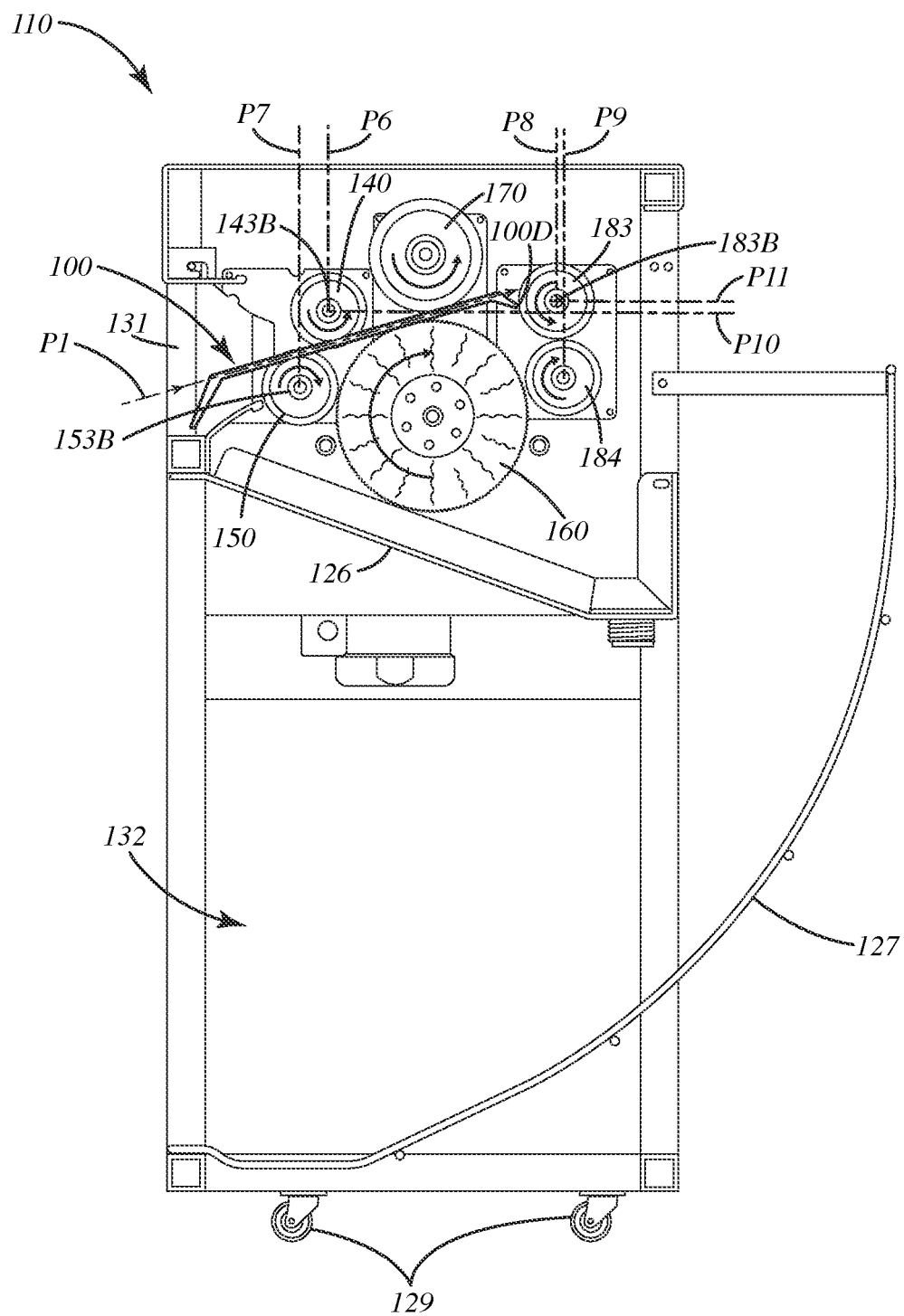
FIG. 14 is a side section view of the mat washer of the first alternative embodiment.

With reference to FIG. 14, the mat 100 is advanced along a first pathway P1 by the first 140 and second 150 compliant rollers grabbing the mat and advancing it along that pathway toward the first brush 160 and second brush 170. As this occurs, the compliant rollers can modify the contours and angles of the mat, and can deform themselves as they engage the mat 100, as described above. The first brush 160 and second brush 170 can operate similar to the embodiment above to remove and scrub debris from the upper and lower surfaces of the mat 100. The brushes also can exert forces on the mat to flatten it or otherwise affect the contours and angles of the mat 100 as described in the embodiment above.

Figure 12:
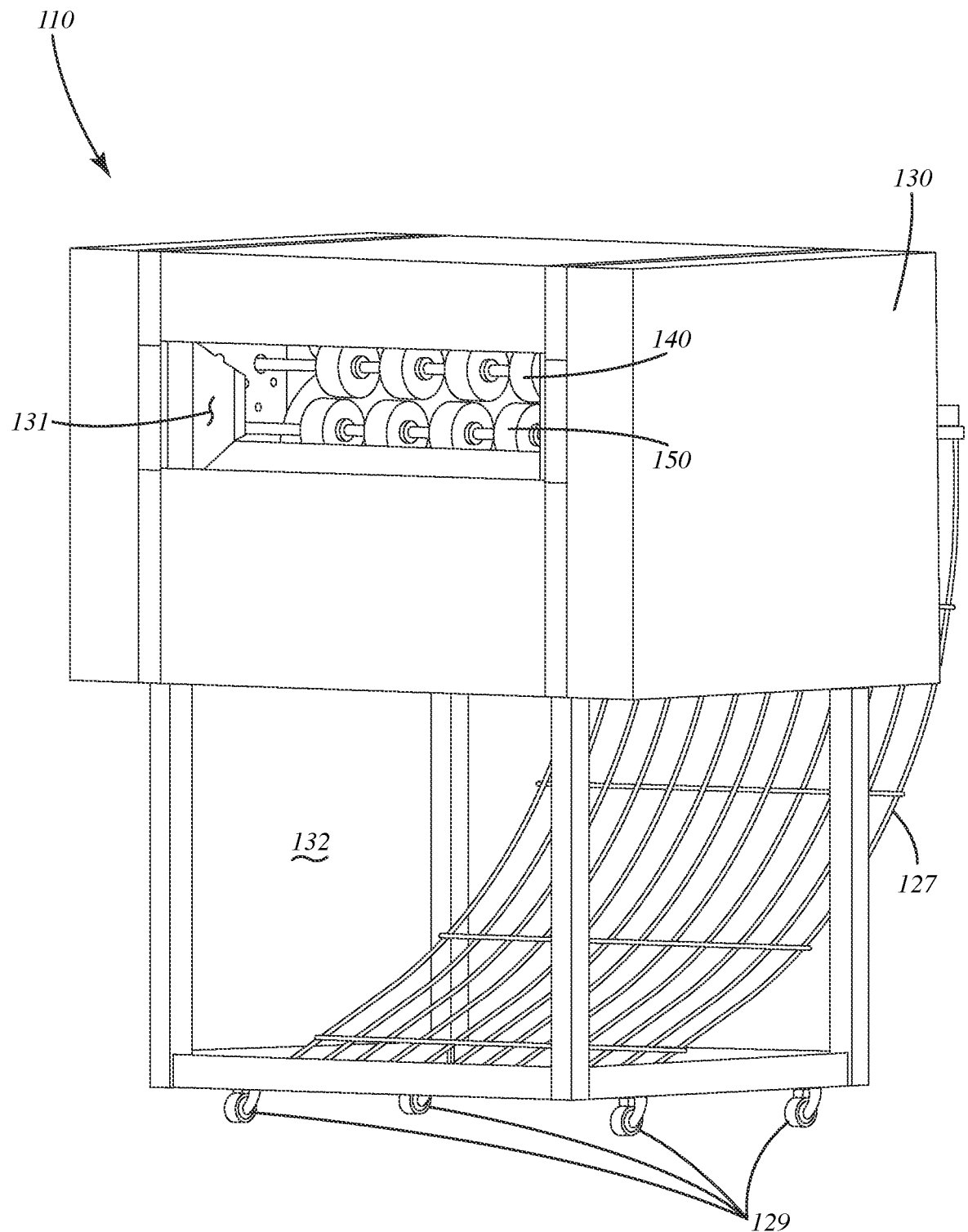
FIG. 12 is a perspective view of a first alternative embodiment of the mat washer.
Figure 13:
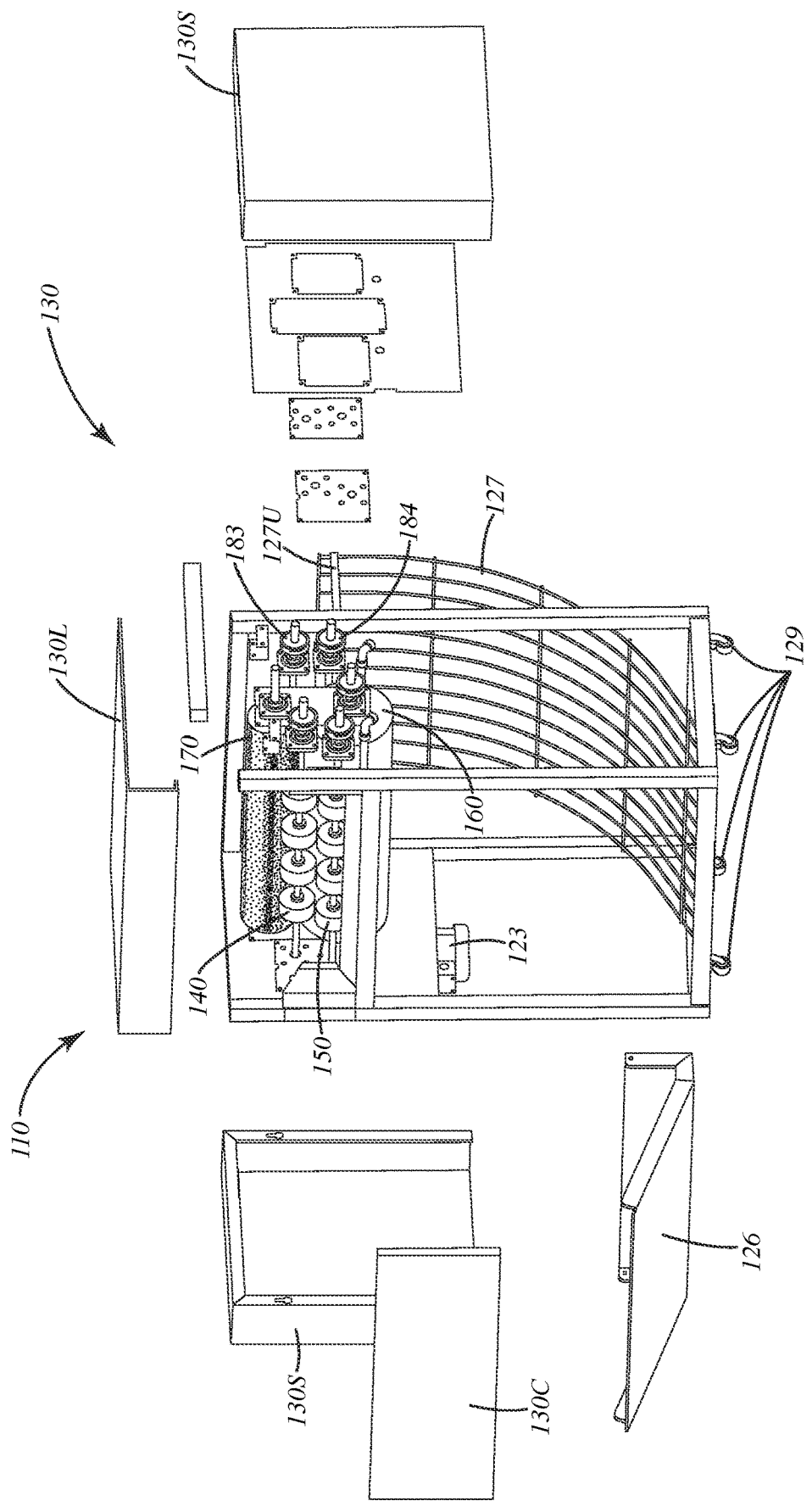
FIG. 13 is a partially exploded view of the mat washer of the first alternative embodiment.

In this embodiment, as shown in FIGS. 12 and 13, the mat washer 110 can include an enclosure 130 that can have various panels to provide enhanced concealment and service exposure to the components housed in the enclosure. For example, the enclosure 130 can include a lid 130L, a front panel 130F and respective side panels 130S that each can be easily attached to and removed from the frame of the mat washer. The frame also can be optionally mounted on castors or wheels 129 to allow the mat washer to be moved around a facility. The mat washer 110 as shown also can include a motor 123 that can drive the various rollers and brushes, similar to the embodiment above. A system of pulleys and belts can be organized relative to the motor 123 to drive each roller and brush in respective directions to advance the mat through the washer to clean or wash the mat.

Optionally, the mat washer 110 can include a frame trough 126 that can be disposed below the various rollers and brushes. This trough can collect a cleaner or rinsing solution that is sprayed on the mat from sprayers, which are not shown, but are similar to the sprayers in the embodiment above. The trough can include a drain and hose, also not shown, that can collect and convey cleaner or rinse solution out from the mat washer and to a container or drain for storage or disposal.

Figure 15:
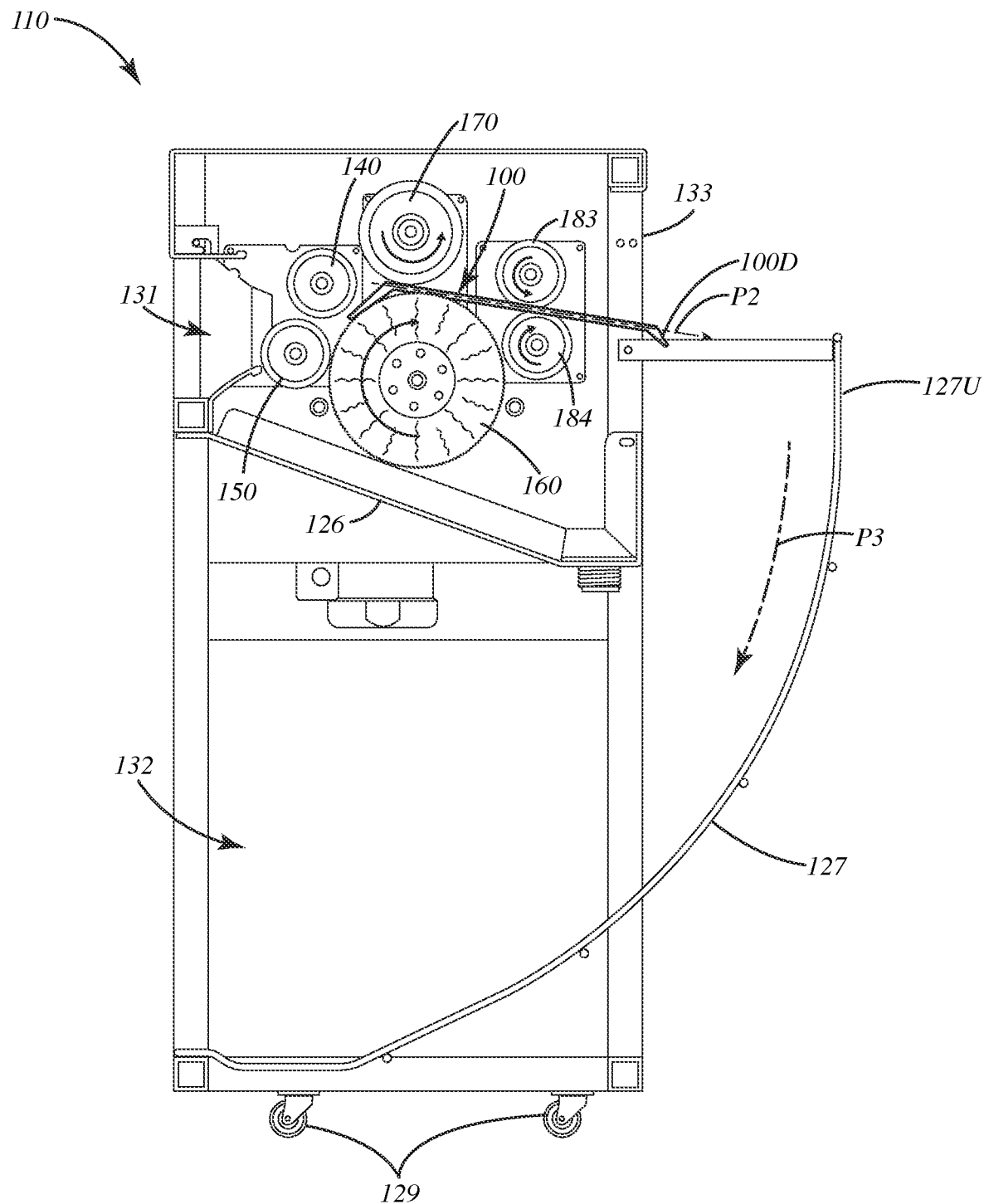
FIG. 15 is another side section view of the mat washer of the first alternative embodiment.

With reference to FIGS. 14 and 15, the mat washer 110 can include a third set of compliant rollers 183 and a fourth set of compliant rollers 184 that are disposed adjacent one another and that can rotate in opposite directions R8 and R9. These roller sets 183 and 184 can be disposed downstream from the first brush 160 and the second brush 170. As shown in FIG. 14, the third set 183 of compliant rollers can be disposed on a bar 183B and can rotate about an axis that lays in a vertical plane P8, and can be disposed downstream of the first brush 160 and the second brush 170. This third set of rollers 183, also referred to as downstream upper rollers, can be further disposed in a horizontal plane P11 and rotate about an axis that lays in that plane P11. This plane P11 can be disposed above another horizontal plane P10, in which an axis of rotation of the first rollers 140 can rotate.

Optionally, the third set of rollers 183 can be slightly higher vertically than the first and second sets of rollers 140, 150 which are upstream of the first brush and second brush 160, 170. Thus, as shown in FIG. 14, when the distal end 100D of the mat 100 projects beyond the first and second brushes, it can engage the upper compliant roller set 183 which then, due to its rotational direction R8, guides that distal end 100D into the opening between the compliant rollers 183 and 184. This in turn will guide the mat 100 between the third set of rollers 183 and fourth set of rollers 184 along the path P2, which can be generally aligned with or aimed toward the upper portion 127U of the capture tray 127.

As mentioned above, the upper or third set of rollers 183 can guide the distal end 100D of the mat 100D between the compliant rollers 183 and 184 so that these rollers can grip and pull the mat from the brushes 160 and 170, deflecting the mat from the first pathway to the second pathway P2, which can be transvers to the first pathway. As this occurs, the mat can bend, and the mat 100 can be pressed between the compliant rulers 183 and 184 and can have certain angles of respective walls relative to the floor and the like adjusted or modified as described above in connection with the first and second rollers 140 and 150. Likewise, parts of the rollers 183, 194 can deflect or deform, similar to the rollers 140, 150 as described above.

The third and fourth sets of compliant rollers can eject the mat 100 out of the enclosure 130 through a rear opening 133 of the enclosure and toward the tray or holding pan 127, which optionally can be curved, can extend from adjacent the rear opening 133 to the front second opening 133 of the enclosure. The mat can engage the upper surface 127U of the tray and slide down an intermediate curved portion 127I along a third pathway P3 that is transverse to the second pathway P2, toward a lower portion 127L of the tray or holding pan 127. Eventually, a user can access the mat 100 on the lower portion 127L of the tray or holding pan 127 through the opening 132. Of course, other set ups for retrieving and supporting the mat can be substituted for those shown.

Although the different elements and assemblies of the embodiments are described herein as having certain functional characteristics, each element and/or its relation to other elements can be depicted or oriented in a variety of different aesthetic configurations, which support the ornamental and aesthetic aspects of the same. Simply because an apparatus, element or assembly of one or more of elements is described herein as having a function does not mean its orientation, layout or configuration is not purely aesthetic and ornamental in nature.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation (s).

In addition, when a component, part or layer is referred to as being "joined with," "on," "engaged with," "adhered to," "secured to," or "coupled to" another component, part or layer, it may be directly joined with, on, engaged with, adhered to, secured to, or coupled to the other component, part or layer, or any number of intervening components, parts or layers may be present. In contrast, when an element is referred to as being "directly joined with," "directly on," "directly engaged with," "directly adhered to," "directly secured to," or "directly coupled to" another element or layer, there may be no intervening elements or layers present. Other words used to describe the relationship between components, layers and parts should be interpreted in a like manner, such as "adjacent" versus "directly adjacent" and similar words. As used herein, the term "and/or" includes any and all combinations of one or more of the associated listed items.

The above description is that of current embodiments of the invention. Various alterations and changes can be made without departing from the broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, any combination of X, Y and Z, for example, X, Y, Z; X, Y; X, Z; Y, Z, and/or any other possible combination together or alone of those elements, noting that the same is open ended and can include other elements.

What is claimed is:

1. A method of washing a vehicle mat, the method comprising:

providing a vehicle mat including a floor substantially conforming to a floor of a vehicle foot well, a forward wall integrally formed with the floor of the mat and extending upward from the floor at a first angle, and a side wall integrally formed with the floor of the mat and extending upwardly from the floor distal from the forward wall and substantially conforming to a foot well wall, the side wall joined with the floor of the mat by a curved transition;

advancing the vehicle mat between a first set of compliant rollers rotating in a first direction and a second set of compliant rollers rotating in a second direction, opposite the first direction, wherein the rollers of the first set of compliant rollers are each separately compliant so as to deform independently of one another, wherein the rollers of the first set of compliant rollers are spaced from each other along a first bar defining an axis of rotation;

engaging the vehicle mat with a first brush rotating in a third direction and a second brush rotating in a fourth opposite the third direction, simultaneously from above the vehicle mat and below the vehicle mat, to scrub debris from the vehicle mat while moving along a first pathway, at a location downstream of the first and second sets of compliant rollers;

rotating the first and second brushes faster than the first and second sets of compliant rollers to exert tension on a portion of the vehicle mat located between the brushes and the compliant rollers and allow the brushes to rotate relative to the vehicle mat to provide a scrubbing action;

deflecting the vehicle mat downstream of the first brush and second brush to a second pathway offset from first pathway; and bending at least one of the floor, the forward wall and the side wall during said deflecting.

2. The method of claim 1, wherein the vehicle mat includes an upper surface and a lower surface, wherein the first brush and the second brush simultaneously scrub the upper surface and the lower surface while the vehicle mat moves on the first pathway.

3. The method of claim 1, wherein the bending includes engaging the forward wall with sufficient force to move the forward wall relative to the floor of the mat so that the first angle is altered to a second angle greater than the first angle.

4. The method of claim 3, wherein the curved transition is flattened as the vehicle mat is deflected to the second pathway.

5. The method of claim 1, wherein the curved transition is flattened as the vehicle mat is deflected to the second pathway.

6. The method of claim 1 comprising:

inserting the vehicle mat through a first opening of a panel;

deflecting again the vehicle mat from the second pathway to a third pathway offset from the second pathway; and depositing the vehicle mat on a pan that is accessible through a second opening of the panel.

7. The method of claim 6, wherein the second opening is below the first opening.

8. The method of claim 1 comprising:

spraying the vehicle mat with a first spray pattern between the first set of compliant rollers and the first brush.

9. The method of claim 8 comprising:

spraying the vehicle mat with a second spray pattern downstream of the first brush, wherein the first spray pattern includes a cleaner, wherein the second spray pattern includes a rinse solution.

10. The method of claim 9, wherein the first brush and the second brush are disposed above a pan configured to support the vehicle mat, wherein the first spray pattern and the second spray pattern impinge on the pan before the vehicle mat reaches the pan.

11. A method of washing a vehicle mat, the method comprising:

providing a vehicle mat including a floor substantially conforming to a floor of a vehicle foot well and a wall integrally formed with the floor of the mat and extending rigidly upward from the floor at a first angle;

advancing the vehicle mat with a plurality of compliant rollers that are rotating under power, at least one of the compliant rollers deforming radially toward an axis of rotation when contacting and grabbing the vehicle mat, wherein the plurality of compliant rollers comprises a first set of compliant rollers, wherein the rollers of the first set of compliant rollers are each separately compliant so as to deform independently of one another, and wherein the rollers of the first set of compliant rollers are spaced from each other along a first bar defining the axis of rotation;

engaging the vehicle mat with a first brush to scrub debris from the vehicle mat while moving along a first pathway beyond the plurality of compliant rollers;

rotating the first brush faster than the plurality of compliant rollers to exert tension on a portion of the vehicle mat located between the first brush and the plurality of compliant rollers and allow the first brush to rotate relative to the vehicle mat to provide a scrubbing action; and bending at least one of the floor and the wall so that the first angle changes to a second angle different from the first angle.

12. The method of claim 11, wherein the plurality of compliant rollers comprises a first roller separated a distance from a second roller, wherein the first roller and second roller apply pressure separately and independently to the vehicle mat within a discontinuous force application zone.

13. The method of claim 11 comprising:

deflecting the vehicle mat downstream of the first brush to a second pathway different from first pathway, wherein the bending occurs during said deflecting.

14. The method of claim 13, wherein the deflecting includes engaging the vehicle mat with another set of compliant rollers downstream of the first brush, wherein the first pathway is transverse to the second pathway.

15. The method of claim 14 comprising:

deflecting the vehicle mat again to a third pathway transverse to the second pathway; and depositing the vehicle mat on a holding pan below the first brush.

16. The method of claim 11 comprising:

depositing the vehicle mat on a holding pan below the first brush;

wherein the vehicle mat includes an upper surface and a lower surface, wherein the lower surface faces upward when the vehicle mat is advanced with the plurality of compliant rollers;

wherein the lower surface faces downward when the vehicle mat is supported on the holding pan.

17. The method of claim 11 comprising:

compressing the wall and the floor of the mat toward a common plane with at least one of the plurality of compliant rollers and the first brush, so that the first angle changes to the second angle, wherein the second angle is greater than the first angle.

18. The method of claim 1, wherein the first set of compliant rollers comprises a first roller separated a distance from a second roller, wherein the first roller and second roller apply pressure separately and independently to the vehicle mat within a discontinuous force application zone.

* * * * *